(12) United States Patent
Shinomi

(10) Patent No.: US 6,437,799 B1
(45) Date of Patent: Aug. 20, 2002

(54) METHOD AND APPARATUS FOR LOGICAL ZOOMING OF A DIRECTED GRAPH

(75) Inventor: Hideaki Shinomi, Kawasaki (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/452,924

(22) Filed: Dec. 6, 1999

(30) Foreign Application Priority Data

Mar. 3, 1999 (JP) .......................................... 11-055284

(51) Int. Cl.$^7$ ................................................ G06T 3/40
(52) U.S. Cl. ...................... 345/666; 345/815; 345/853; 707/6
(58) Field of Search .................. 345/666, 667, 345/670, 671, 788, 815, 853, 854, 855, 645; 707/1, 104, 104.1, 2, 6, 7

(56) References Cited

U.S. PATENT DOCUMENTS 5,856,828 A * 1/1999 Letcher, Jr. .................. 345/420
6,151,595 A * 11/2000 Pirolli et al. .................... 707/1
6,289,354 B1 * 9/2001 Aggarwal et al. .......... 707/104

FOREIGN PATENT DOCUMENTS

JP 6131470 5/1994 ............ G06F/15/72
JP 9134440 5/1997 ............ G06T/11/20

OTHER PUBLICATIONS

"Graphical Fisheye Views", Communication of the ACM, Dec. 1994, vol. 37, No. 12, pp. 73–83.*
"Visual Understanding of Hierarchical System Structures" K. Sugiyama, et al., IEEE Transactions on Systems, Man, and Cybernetics, vol. SMC–11, No. 2, Feb., 1981.

* cited by examiner

Primary Examiner—Matthew Luu
Assistant Examiner—Thu-Thao Havan
(74) Attorney, Agent, or Firm—J A. Bruce Clay; Carstens, Yee & Cahoon

(57) ABSTRACT

A directed graph is logically zoomed, whereby the appearance of a node directly related to a target node can be exaggerated and the structure of an entire graph can be readily understood. A directed graph is used in which hierarchical nodes are connected by arcs. In the directed graph, a node that has a predetermined logical relationship with a selected node is displayed differently than are the other nodes. For example, a displayed node logically near the selected node is large, while a displayed node logically distant is small, or the node logically near the selected node is moved closer to the selected node.

15 Claims, 7 Drawing Sheets

METHOD AND APPARATUS FOR LOGICAL ZOOMING OF A DIRECTED GRAPH

FIELD OF THE INVENTION

The present invention relates to a logical zooming method and apparatus for a directed graph in which hierarchical nodes are connected by arcs.

BACKGROUND OF THE INVENTION

Conventionally, for CASE (Computer Aided Software Engineering) tools, a call relationship for program routines and a hierarchical relationship of classes are displayed by using a directed graph that uses nodes and arcs. Representations of such graphs are used by many other software programs to display object relationships. One example is a display function for hierarchical relationships in a call-relationship graph of routines for software available on the market, or in a graph of the development environment for an object oriented language, such as C++. FIG. 6 is a diagram showing the complete structure of a graph for routines or for a hierarchical class.

When such a directed graph becomes large as a result of the addition of nodes (see FIG. 6), and if an image of the entire graph is then displayed in a window on the display device of a PC, either names written in the nodes (e.g., routine names) are so small that they can not be read, or the graph itself is so complex that arcs are difficult to trace. To resolve this problem, various conventional tools are available that include a function for enlarging a portion of a graph (a zooming function). FIG. 7 is a diagram showing an enlarged view of the graph in FIG. 6 that was obtained by using a conventional zooming function.

By zooming in on a portion of the graphs the names in some of the nodes have become legible. However, it is not possible in every case to identify the nodes directly related to a target node, nor is it possible to obtain a good understanding of the structure of the graph. Thus, in the example in FIG. 7, the following problems have arisen:

(1) It is not possible to infer from the image that "D" is called by both "A" and "C." More specifically, while the topmost node in FIG. 7 is "A" and the rightmost node at the second level from the top is "C," because the graph was zoomed, neither node is shown on the screen; only the arrows leading from the nodes to "D" are visible; and (2) It is not possible to obtain a good understanding of the structure of the entire graph. For example, that a specific node is called by many nodes cannot be understood unless that node is displayed on the screen.

SUMMARY OF THE INVENTION

To resolve the above shortcomings, it is one object of the present invention to provide for a directed graph a logical zooming method and apparatus, whereby in a display a node directly related to a target node is exaggerated and the structure of the entire graph can be readily understood.

To achieve the above object, according to the logical zooming method of the present invention, a directed graph is used in which hierarchical nodes are connected by arcs. In the directed graph, a node having a predetermined logical relationship with a selected node is displayed in a different manner than are other nodes. As a result, the appearance of a node directly related to a target node can be exaggerated.

As a specific preferred example, on a screen, the size of a displayed node logically near a selected specific node is enlarged, while the size of a displayed node logically distant from the selected specific node is reduced. When the hierarchy level of the selected node is n, distances between hierarchy levels n and n+1 and between hierarchy levels n and n−1 are set so that it is easy to read the name of the selected node and the name of a node, connected by an arc, that uses the selected node as a start point or an end point. The sizes of the other nodes are reduced so that all the nodes can fit on the screen. As a result, the node directly related to the target node is exaggerated, and the structure of the graph can be readily understood.

As another preferred example, at each of the hierarchy levels n+1 and n−1, relative to the hierarchy level n of the selected specific node, the transverse arrangement of nodes is changed, so that a node for which the selected node is a start point or an end point is positioned nearer the selected node. Therefore, the node directly related to the target node is exaggerated.

As an additional preferred example, when an arc connecting the specific node and a node having a predetermined logical relationship with the specific node is a dummy node that extends across a hierarchy, the dummy node is defined as a display dummy node for displaying, in that hierarchy, the node having the predetermined logical relationship with the selected specific node. The dummy node is displayed differently than the other nodes. As a result, when a node logically related to the specific node is located at a more distant hierarchy level, the relationship can be understood even when the size of the hierarchy level, at which is located the node having the predetermined logical relationship with the selected node, is reduced.

The logical zooming apparatus for a directed graph according to the present invention is an apparatus for logically zooming a directed graph in which a plurality of hierarchical nodes are connected by arcs. The logical zooming apparatus comprises: an input device for entering data; a display device for displaying a directed graph; an arc start/end input unit for reading node information at start points and end points of all the arcs to be processed; a graph information extractor for, based on start/end point information for all the arcs, internally generating graph information in which the nodes are linked together by the arcs; a coordinate calculator for determining the x-y coordinates for each node on the screen of the display device; and a graph information storage unit for storing for a display device information concerning the directed graph. Therefore, the logical zooming method, for a directed graph, of the present invention can be implemented.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
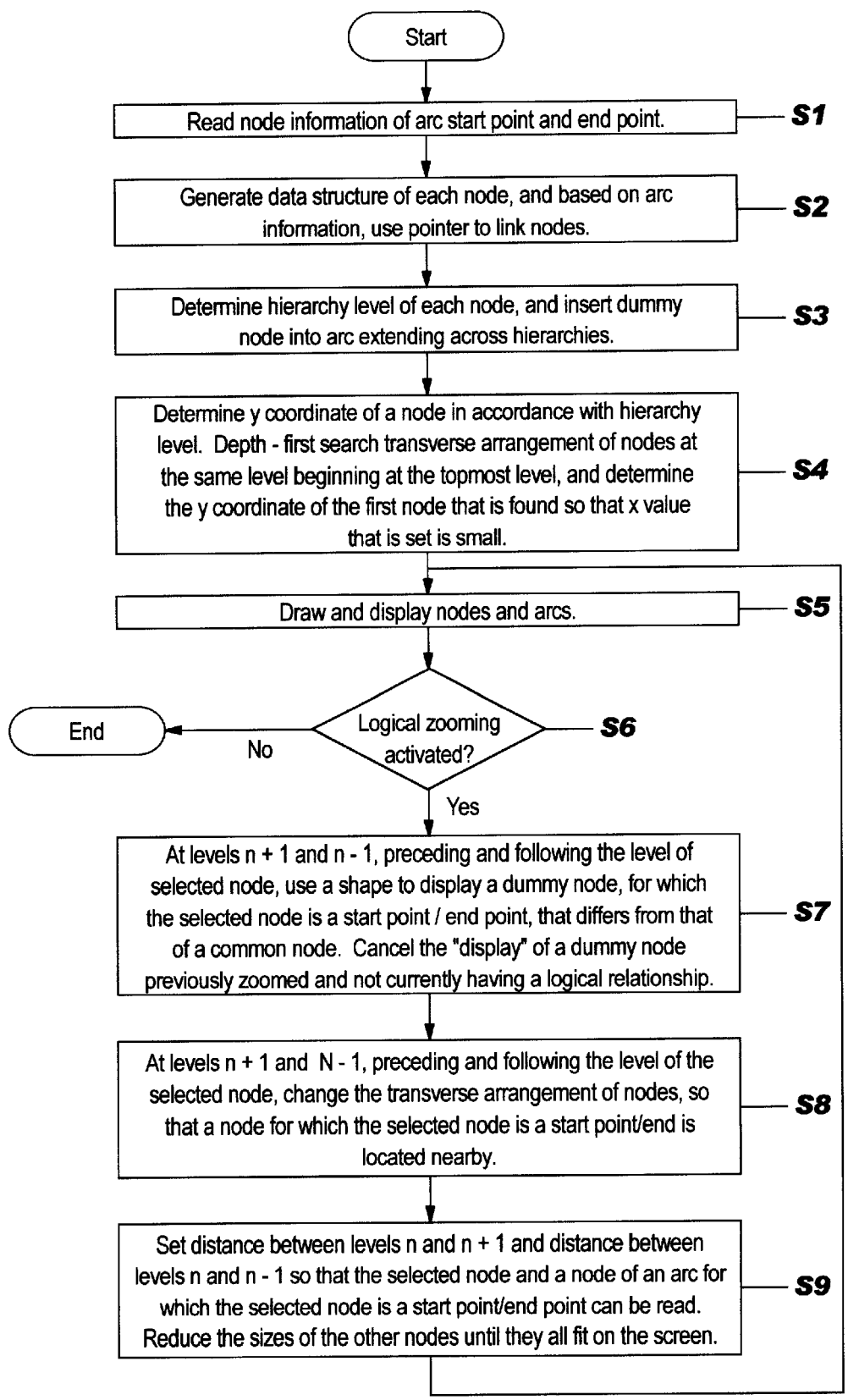
FIG. 1 is a flowchart showing an example method for the display of a directed graph, including a method according to the present invention for zooming a directed graph.

FIG. 1 is a flowchart showing a method for displaying a directed graph, including a logical zooming method for a directed graph according to the present invention. The entire graph shown in FIG. 6 or the enlarged image shown in FIG. 7 is first displayed by using the conventional technique (steps 1 to 5), and a user selects a desired node from the diagram. Then, the logical zooming, for a directed graph, of the present invention is performed (steps 6 to 9). The following algorithm, described in, for example, "Method Of Visual Understanding Of Hierarchical System Structures," K. Sugiyama, et. al., IEEE Transactions on Systems, Man, and Cybernetics, Vol. SMC-11, No. 2, February, 1981, can be referred to as a conventional method for displaying a directed graph:

1. Determination of a level originating with an upper level (determination is made in accordance with a hierarchy level displayed on a screen);
2. Insertion of a dummy node (portions wherein an arc extending a level is folded);
3. Determination of the transverse position (y coordinate) of a node based on a level (based on a level, the y coordinate of a node is determined at a constant interval); and
4. Determination of the transverse position of a node. Although there are various standards governing the determination of the positioning of objects to be displayed, positions are so determined that they do not increase the number of arc intersections.

Processing will be specifically described while referring to FIG. 1. First, node information is read for a start point and an end point that represents an arc (S1). Then, a data structure is generated for each node, and based on the arc information, nodes are linked together by pointers (S2). The hierarchy levels of the nodes are determined, and a dummy node is inserted into an arc that extends across hierarchies (S3). Following that, the y coordinates of the nodes are determined at constant intervals based on the hierarchy levels (S4). Depth-first search transverse arrangement of the nodes at the same hierarchy level beginning at the topmost level, and a small x coordinate is set for the first node that is found. Finally, the nodes and arcs are drawn and displayed (S5).

When the directed graph is arranged and displayed based on the above algorithm, and when the user selects a desired node, the following algorithm is used to rearrange the nodes:

1. The nodes at the upper levels are not changed (in order that all the hierarchy levels can be constantly displayed);
2. The shape of a dummy node directly related to the selected node (calls or is called) is changed, so that its name is displayed in a node having a shape (e.g., an ellipse) that differs from the shape (e.g., a square) of a common node;
3. The nodes at levels distant from the selected node are so arranged that the interval established between the levels (in the direction of the y coordinate) is smaller. The sizes set for these nodes are also small; and
4. A node directly related to the selected node (calls or is called) is moved near the selected node after the transverse arrangement order for/location of that node has been corrected. A node not directly related to the selected node is displayed at a smaller size, as a node distant from the selected node.

A specific explanation will be given while referring to FIG. 1. First, whether the logical zooming process of the present invention is performed is decided by implementing a search to determine whether a user has selected a specific node (S6). When the logical zooming is performed, at hierarchy levels n+1 and n−1, which respectively precede and follow hierarchy level n of the selected specific node, a dummy node directly related to the selected node, i.e., a dummy node using the selected node as a start point/an end point, is defined as a display dummy node having a shape that differs from the normal shape of a node, e.g., a display dummy node has an elliptical shape while a common node is square. "Display" is canceled for a dummy node that was previously zoomed as a display dummy node and that is not currently related to the selected node (S7). Then, at hierarchy levels n+1 and n−1, which respectively precede and follow hierarchy level n of the selected node, the transverse arrangement of the nodes is changed, so that nodes (including a dummy node) for arcs that use the selected node as a start point/end point are located nearby (S8). The sizes of the selected node and the nodes (including the dummy node) for the arcs that use the selected node as a start point/end point, and the distances between hierarchy levels n and n+1 and between hierarchy levels n and n−1 are so set that the characters in the nodes can be read. The other nodes are reduced in size until they can all fit on the screen (S9). Program control then returns to S5, and the nodes and arcs are drawn and displayed. Following this, at S6 a check is performed to determine whether the user has directed the performance of another logical zooming process. When the user has directed that another logical zooming process be performed, the processing for S7 to S9 and for S5 is repeated.

Figure 2:
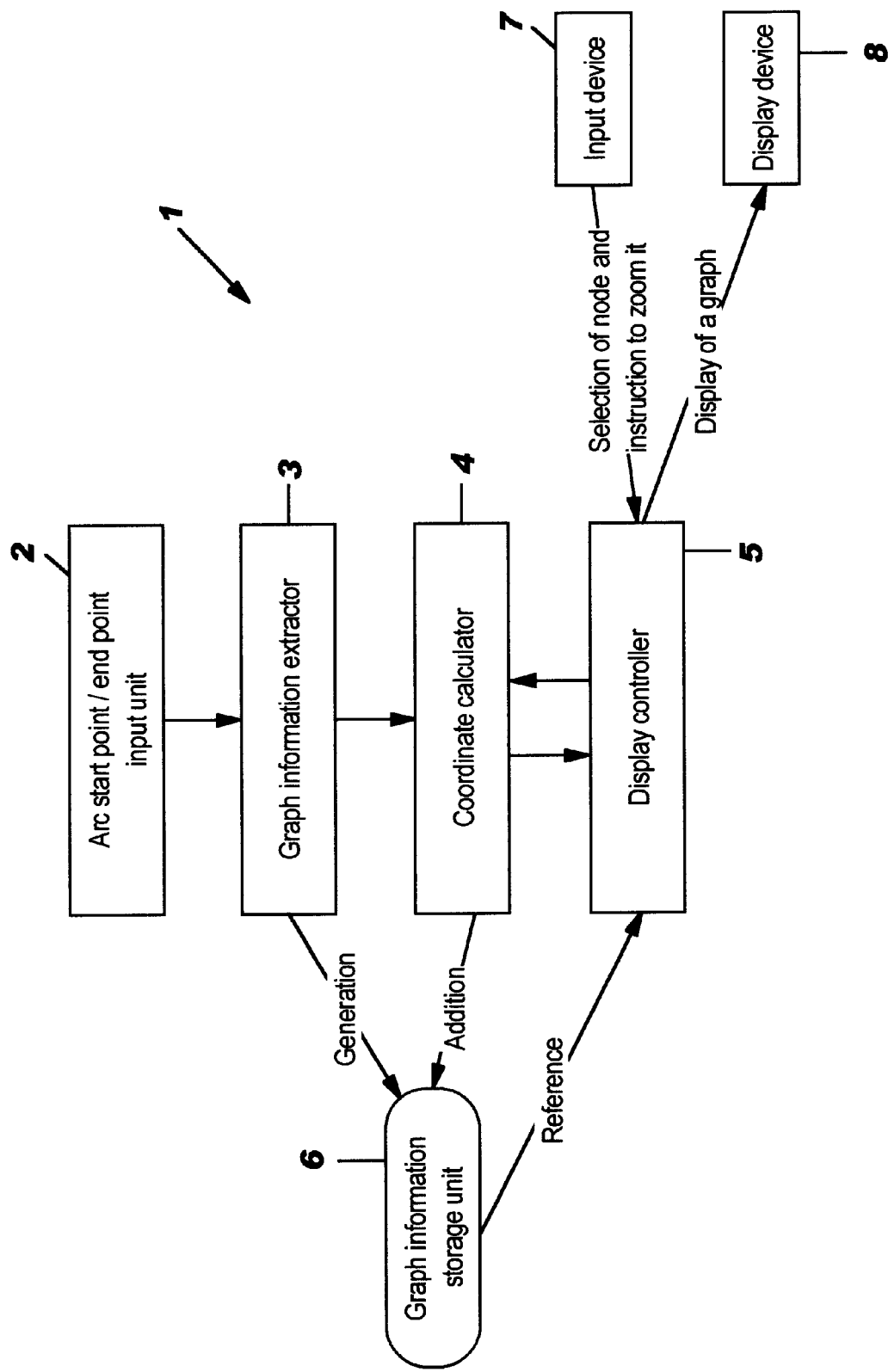
FIG. 2 is a block diagram showing the arrangement of an apparatus according to the present invention for the logical zooming of a directed graph.

FIG. 2 is a block diagram showing an example structure of a logical zooming apparatus for a directed graph according to the present invention. A logical zooming apparatus 1 for a directed graph comprises: an arc start point/end point input unit 2; a graph information extractor 3; a coordinate calculator 4; a display controller 5; a graph information storage unit 6, for storing generated graph information and obtained coordinates, and for referring to the stored graph information; an input device 7, for selecting a node and for instructing the zooming of the selected node; and a display device 8, for displaying a graph.

For all the arcs to be processed, the arc start point/end point input unit 2 reads node information of a start point and an end point, such as information for A→B, A→C and B→D. The graph information extractor 3 uses the start point/end point information for all the arcs, and internally generates graph information wherein the nodes are linked together by the arcs. At this time, not only is reference information generated for the relationship of an arc extending from the start node to the end node, but also an inverted relationship, extending from the end node to the start node, is generated as internal data. The coordinate calculator 4 performs the following calculation to obtain the x-y coordinates of the nodes (including the dummy node) displayed on the screen:

1) determine the size of a display node;
2) determine which hierarchy level corresponds to the direction of the y coordinate;
3) insert a dummy node of an arc extending across hierarchies; and
4) determine arrangement information of nodes in the same hierarchy level that correspond to the direction of the x coordinate.

The display controller 5 draws the nodes on the display device based on the coordinates and the sizes of the nodes (including the dummy node). The arcs connecting the nodes are also drawn. When a node is designated and zooming is instructed for the performance of the logical zooming of the present invention, the coordinate calculator 4 is activated to rearrange the nodes.

Figure 3:
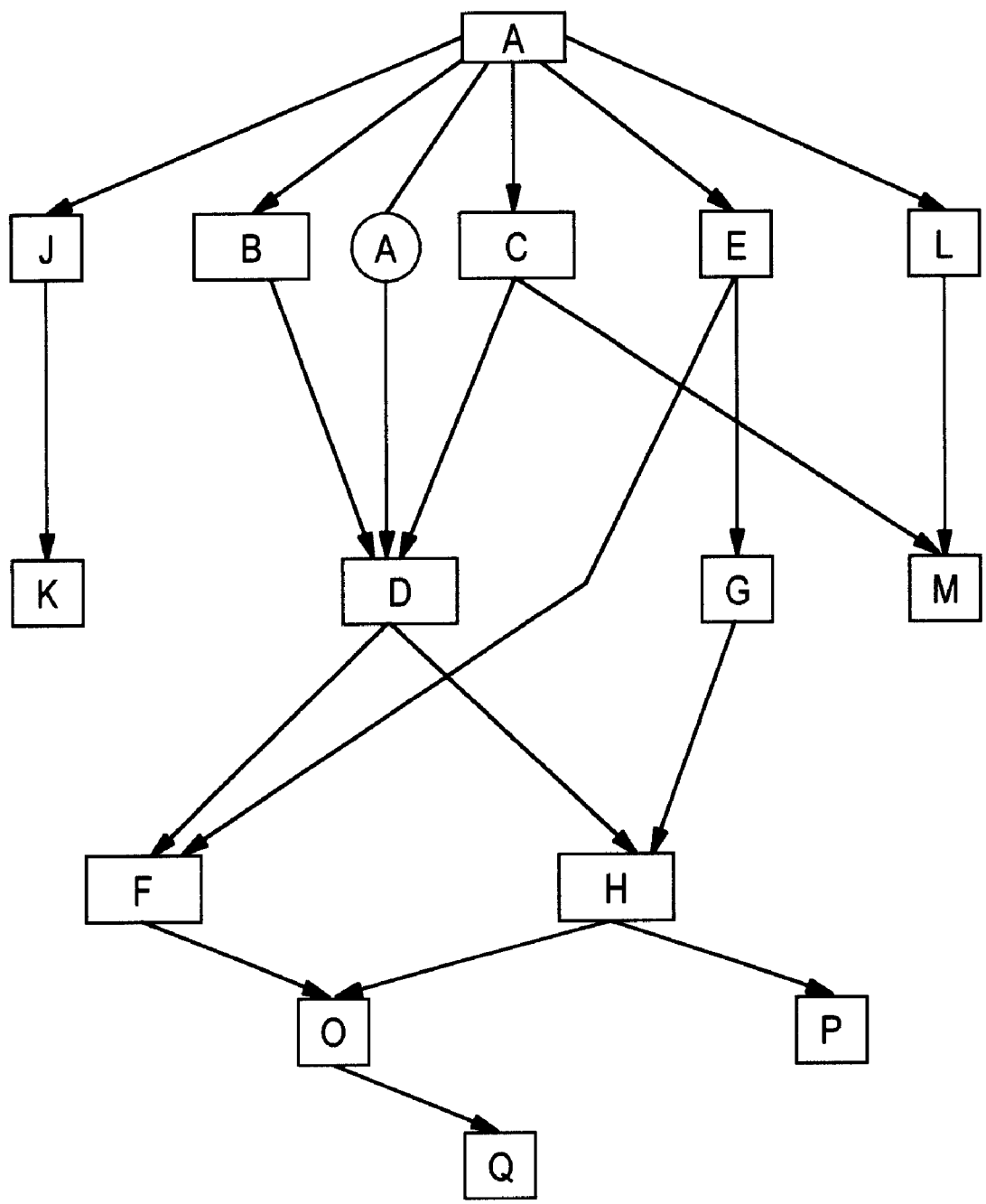
FIG. 3 is a diagram showing a display obtained by using the logical zooming of the present invention.
Figure 6:
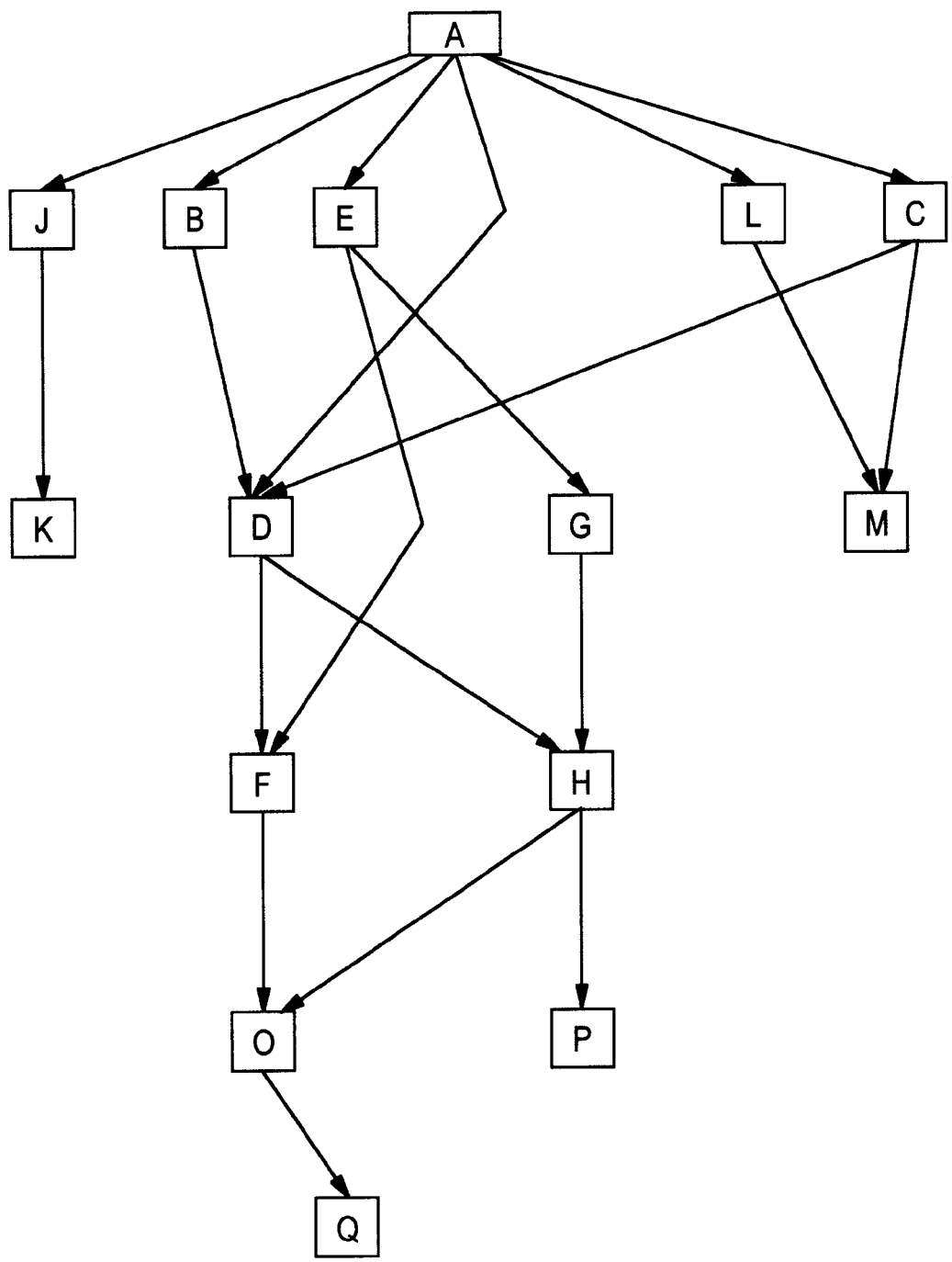
FIG. 6 is a diagram showing the conventional structure of an entire display, such as a relationship of routines and a hierarchical structure.
Figure 7:
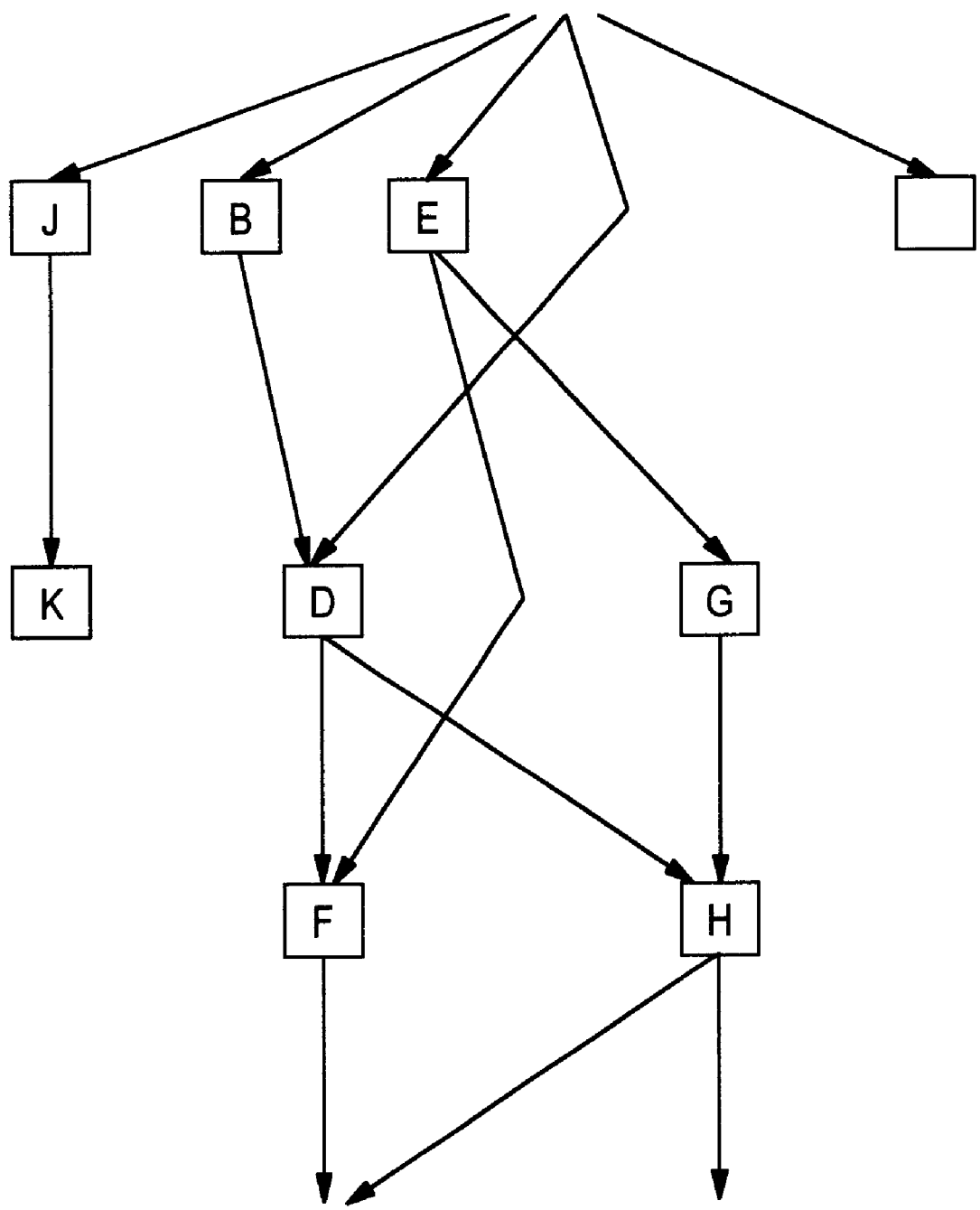
FIG. 7 is a diagram showing the display in FIG. 6 after it has been partially enlarged.

An explanation will now be given for the result obtained by the logical zooming of a directed graph according to the present invention. FIG. 3 is a diagram showing the hierarchical structure provided by the logical zooming performed by the present invention. In FIG. 3, the nodes are the same as those in FIG. 6, and node D is selected and logically zoomed. The display in FIG. 3 has the following characteristics:

1) The selected node D, nodes B, A and C, which call node D, and nodes F and H, which are called, are large enough when displayed that enclosed letters can be read, while the other nodes that are displayed are compressed and small (the farther a node is from node D, the smaller it is);
2) Originally, node A is the topmost node (the highest in FIG. 6). But en route, at the location whereat the arc is folded, instead of a square node, A is displayed as "A" in an elliptical node (a dummy node in an algorithm; see the arc in FIG. 6 that extends from node A to D). Therefore, it can be seen at a glance that node A reads node D;
3) The transverse location of a node, such as node C in FIG. 7, which originally is horizontally separated node D (outside the screen in FIG. 7), is corrected, and nodes related to node D are positioned adjacent to node D; and
4) All the modal relationships can be identified in FIG. 3, whereas this is impossible in FIG. 7.

Figure 4:
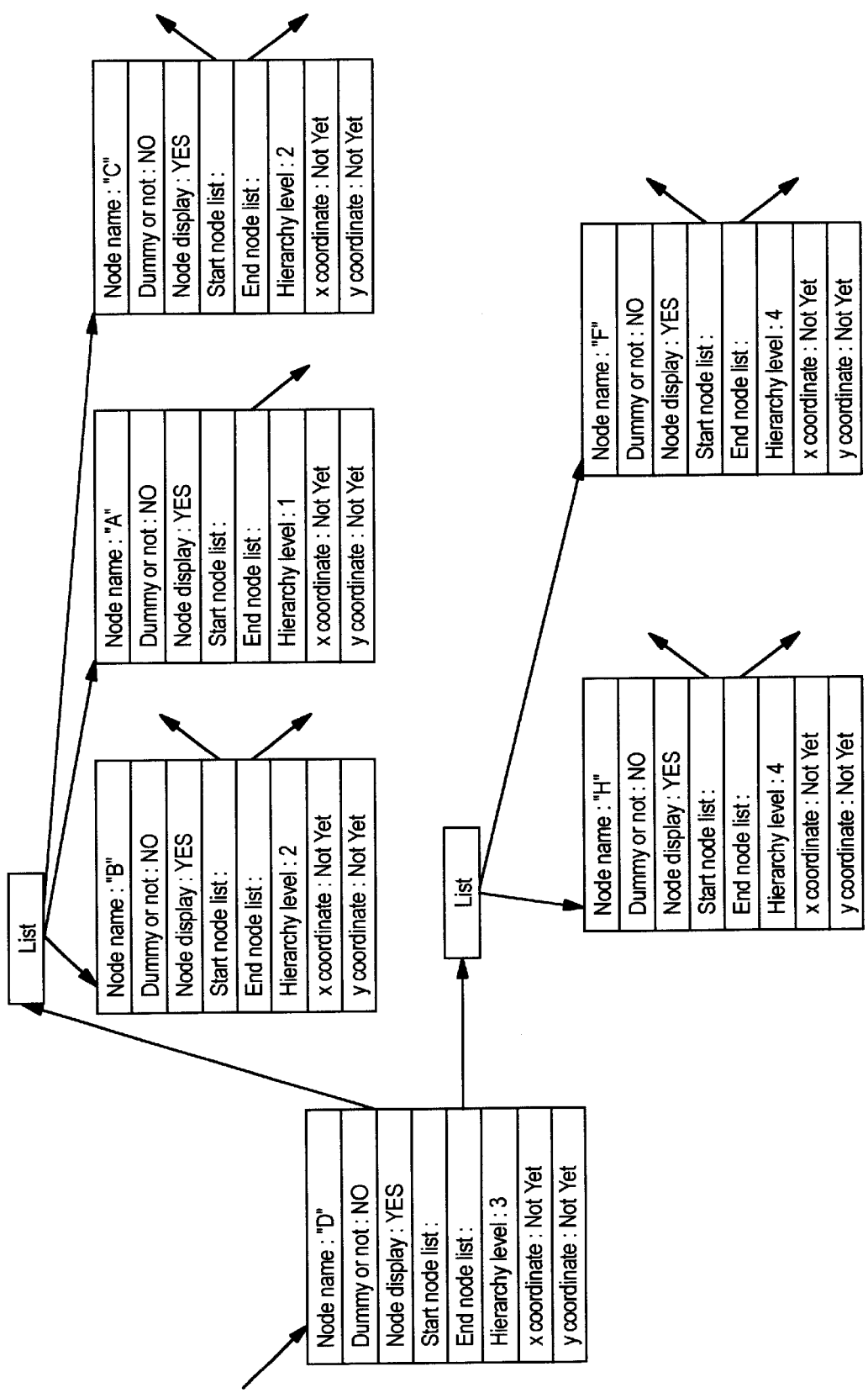
FIG. 4 is a conceptual diagram showing the data structure of individual nodes before a display dummy node has been inserted.
Figure 5:
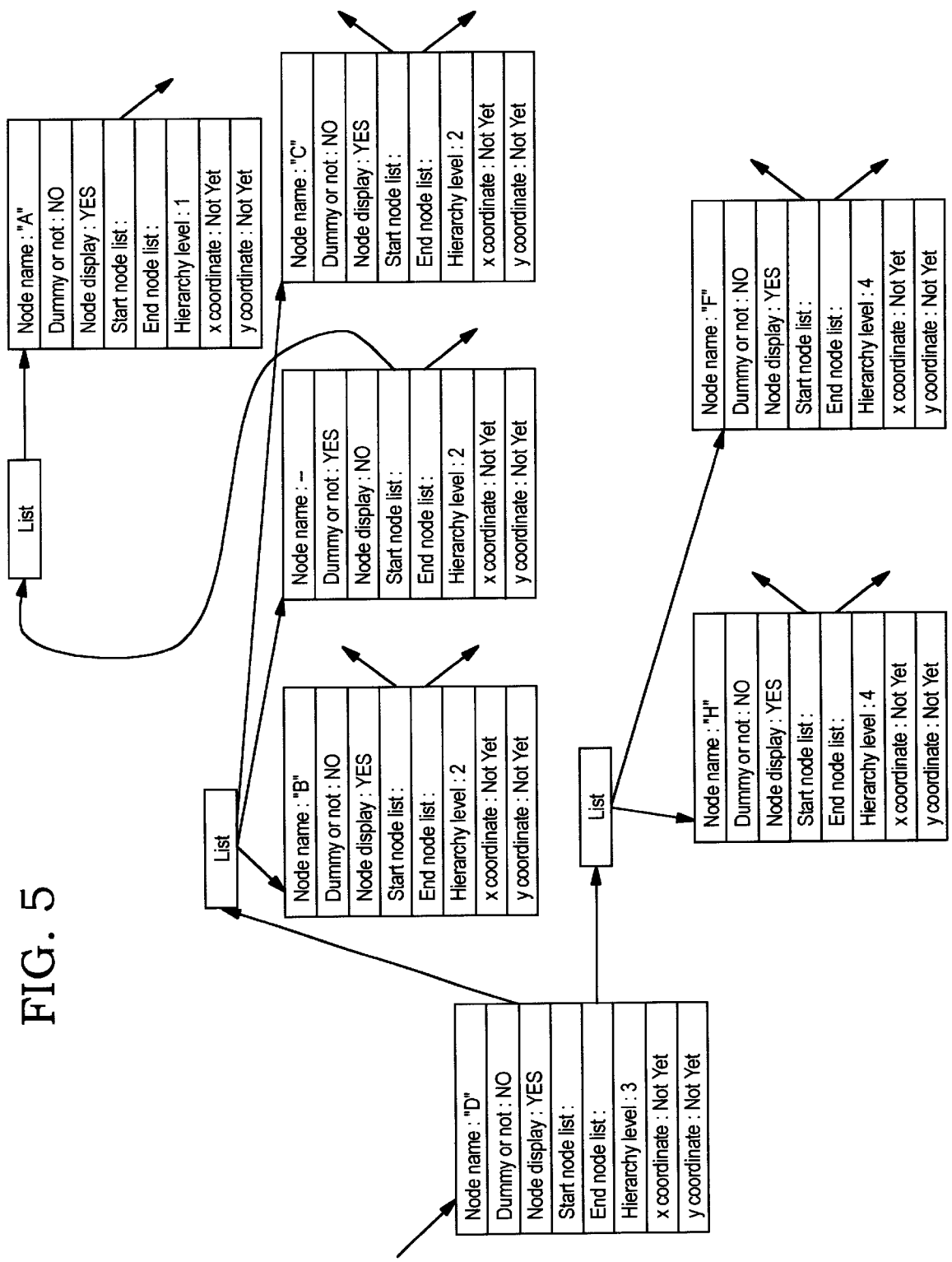
FIG. 5 is a conceptual diagram showing the data structure of individual nodes after a display dummy node has been inserted.

An explanation will now be given for the data structure of each node that is used for the logical zooming of a directed graph of the present invention, while comparing a graph into which no dummy node has been inserted with the same graph after one has been inserted. FIG. 4 is a conceptual diagram showing the data structure of each node before a dummy node has been inserted, and FIG. 5 is a conceptual diagram showing the data structure of each node after a dummy node has been inserted. A data structure for each node consists of a node name, a flag indicting whether the pertinent node is a dummy, a node display flag, a start node list, an end node list, a hierarchy level, an x coordinate, and a y coordinate.

Assume that, as in the above description, node D is selected and, before the dummy node is inserted, is in the state depicted in FIG. 4. "B," "A" and "C" are entered in the start node list of node D, and "H" and "F" are entered in the end node list of node D. Therefore, the logically related nodes are B, A, C, H and F. Node D is at hierarchy level 3, while node A, which is one of the start nodes in the list for the arc, is at hierarchy level 1, and the arc that connects nodes A and D is extended across the hierarchies. In this case it is found that the portion between node A and node D is a dummy node. A dummy node corresponds to a location in a graph whereat an arc is folded.

After a dummy node is inserted into FIG. 5, the dummy node, which is at hierarchy level 2, is added to the start node list of node D, and node A is entered in the start node list of the dummy node. Since the name of a dummy node varies depending on the node near which logical zooming is performed, the dummy node in this instance is not described in FIG. 5. When node D is selected and zooming is performed around node D, as in the above example, "A" is used to represent the display dummy. And if node A were to be selected and zooming performed around it, "D" would be used to represent the dummy node. If logical zooming around node A or D is not performed, the node itself is not displayed (this corresponds to a portion wherein the arc is folded), and basically, a node display flag is set to NO. However, since a dummy node must be displayed when it is logically related to a selected node, the node display flag would be set to YES, and the dummy node changed to a display dummy node. At this time, the x and y coordinate values have not yet been determined.

Thus, a node logically related to a specific node that has been selected is displayed differently from other nodes. Preferably, a displayed node logically near a selected node is large, while a displayed node logically distant is small, or a node logically near the selected node is moved and positioned near the selected node. Thus, an exaggerated image can be displayed of a node directly related to a target node, while at the same time, the structure of the entire graph can be readily understood.

Although the present invention has been described with respect to specific preferred embodiments thereof, various changes and modifications may be suggested to one skilled in the art, and it is intended that the present invention encompasses such changes and modifications as fall within the scope of the appended claims.

What is claimed:

1. A logical zooming method for a directed graph, in which a plurality of hierarchical nodes are connected by arcs, comprising a step of:
    displaying said hierarchical nodes utilizing a plurality of hierarchy levels, each one of said hierarchical nodes being displayed at a location in said graph which corresponds to one of said hierarchy levels;
    logically zooming in on a specified one of said hierarchical nodes; and
    displaying said specified one of said hierarchical nodes and ones of said hierarchical nodes that are logically near said specified one of said hierarchical nodes differently from other ones of said hierarchical nodes, each one of said hierarchical nodes continuing to be displayed at a location in said graph which corresponds to said one of said hierarchy levels, wherein after said step of logically zooming, each one of said hierarchical nodes remains displayed in a same one of said hierarchy levels in which said one of said hierarchical nodes was displayed prior to said step of logically zooming.

2. The logical zooming method according to claim 1, whereby said specific node and a displayed node logically near said specific node are enlarged, and all displayed nodes logically distant from said specific node are reduced in size.

3. The logical zooming method according to claim 2, whereby, when a hierarchy level of said specific node is n, distances between hierarchy levels n and n+1 and between hierarchy levels n and n−1 are set in order to allow a name of said specific node and names of nodes, connected by arcs, for which said specific node is a start point or an end point to be clearly readable and whereby sizes of other nodes are reduced so that all nodes can fit on a screen.

4. The logical zooming method according to claim 1, whereby at each hierarchy level n+1 and n−1 a transverse arrangement of nodes is changed, so that relative to a hierarchy level n of said specific node, a node for which said specific node is a start point or an end point is positioned nearer to specific node.

5. The logical zooming method according to claim 1, whereby, when an arc connecting said specific node and a node having said predetermined logical relationship with said specific node is a dummy node that extends across a hierarchy, said dummy node is defined as a display dummy node for displaying, in said hierarchy, said node having said predetermined logical relationship with said selected specific node.

6. The method according to claim 1, further comprising the steps of:

displaying said hierarchical nodes utilizing said plurality of hierarchy levels, each one of said hierarchical nodes being displayed at a y-coordinate location in said graph which corresponds to one of said hierarchy levels; and displaying said one of said hierarchical nodes and ones of said hierarchical nodes that are logically near said one of said hierarchical nodes differently from other ones of said hierarchical nodes, each one of said hierarchical nodes continuing to be displayed at said y-coordinate after said step of logically zooming.

7. The method according to claim 1, further comprising the step of displaying said hierarchical nodes utilizing said plurality of hierarchy levels wherein one of said hierarchy levels associated with one of said hierarchical nodes can be determined by viewing said graph.

8. A logical zooming apparatus for a directed graph, in which a plurality of hierarchical nodes are connected by arcs, comprising:

an input device for entering data;

a display device for displaying the directed graph;

an arc start/end input unit for reading node information at start points and end points of all arcs to be processed;

a graph information extractor for, based on start/end point information for all the arcs, internally generating graph information in which said nodes are linked together by said arcs;

a coordinate calculator for determining x-y coordinates for each of said nodes displayed on a screen of said display device;

a graph information storage unit for storing information for said directed graph for said display device;

means for logically zooming in on a specified one of said hierarchical nodes; and means for displaying said specified one of said hierarchical nodes and ones of said hierarchical nodes that are logically near said specified one of said hierarchical nodes differently from other ones of said hierarchical nodes, each one of said hierarchical nodes continuing to be displayed at a location in said graph which corresponds to said one of said hierarchy levels, wherein after said step of logically zooming, each one of said hierarchical nodes remains displayed in a same one of said hierarchy levels in which said one of said hierarchical nodes was displayed prior to said step of logically zooming.

9. The apparatus according to claim 8, further comprising:

means for displaying said hierarchical nodes utilizing said plurality of hierarchy levels, each one of said hierarchical nodes being displayed at a y-coordinate location in said graph which corresponds to one of said hierarchy levels; and means for displaying said one of said hierarchical nodes and ones of said hierarchical nodes that are logically near said one of said hierarchical nodes differently from other ones of said hierarchical nodes, each one of said hierarchical nodes continuing to be displayed at said y-coordinate after said step of logically zooming.

10. The apparatus according to claim 8, further comprising means for displaying said hierarchical nodes utilizing said plurality of hierarchy levels wherein one of said hierarchy levels associated with one of said hierarchical nodes can be determined by viewing said graph.

11. The logical zooming method according to claim 8, whereby said specific node and a displayed node logically near said specific node are enlarged, and all displayed nodes logically distant from said specific node are reduced in size.

12. A computer program product recorded on computer readable medium for logically zooming a directed graph in which a plurality of hierarchical nodes are connected by arcs, comprising:

computer readable means for entering data;

computer readable means for displaying the directed graph;

computer readable means for reading node information at start points and end points of all arcs to be process;

computer readable means for internally generating graph information in which said nodes are linked together by said arcs;

computer readable means for determining x-y coordinates for each of said nodes displayed on screen of a display device;

computer readable means for storing information for said directed graph for said display device;

instruction means for logically zooming in on a specified one of said hierarchical nodes; and instruction means for displaying said specified one of said hierarchical nodes and ones of said hierarchical nodes that are logically near said specified one of said hierarchical nodes differently from other ones of said hierarchical nodes, each one of said hierarchical nodes continuing to be displayed at a location in said graph which corresponds to said one of said hierarchy levels, wherein after said step of logically zooming, each one of said hierarchical nodes remains displayed in a same one of said hierarchy levels in which said one of said hierarchical nodes was displayed prior to said step of logically zooming.

13. The product according to claim 12, further comprising:

instruction means for displaying said hierarchical nodes utilizing said plurality of hierarchy levels, each one of said hierarchical nodes being displayed at a y-coordinate location in said graph which corresponds to one of said hierarchy levels; and instruction means for displaying said one of said hierarchical nodes and ones of said hierarchical nodes that are logically near said one of said hierarchical nodes differently from other ones of said hierarchical nodes, each one of said hierarchical nodes continuing to be displayed at said y-coordinate after said step of logically zooming.

14. The product according to claim 12, further comprising instruction means for displaying said hierarchical nodes utilizing said plurality of hierarchy levels wherein one of said hierarchy levels associated w,with one of said hierarchical nodes can be determined by viewing said graph.

15. The logical zooming method according to claim 12, whereby said specific node and a displayed node logically near said specific node are enlarged, and all displayed nodes logically distant from said specific node are reduced in size.

* * * * *